United States Patent [19]

Haas et al.

[11] 4,359,402

[45] Nov. 16, 1982

[54] MONOOLEFIN CATALYSTS AND METHOD FOR THE PREPARATION THEREOF

[75] Inventors: Frederick W. Haas, University Heights; William J. Miloscia, Shaker Heights, both of Ohio

[73] Assignee: The Standard Oil Company, Cleveland, Ohio

[21] Appl. No.: 160,041

[22] Filed: Jun. 16, 1980

[51] Int. Cl.$^3$ ............................................... C08F 4/64
[52] U.S. Cl. ................................ 252/429 B; 526/128
[58] Field of Search .................................... 252/429 B

[56] References Cited

U.S. PATENT DOCUMENTS

| | | | |
|---|---|---|---|
| 2,842,504 | 7/1958 | Jones | 252/430 X |
| 2,976,253 | 3/1961 | Edwards | 252/430 X |
| 3,849,334 | 11/1974 | Frielingsdorf et al. | 252/429 B |
| 4,235,747 | 11/1980 | Leung | 252/429 B |

OTHER PUBLICATIONS

Rose et al., *The Condensed Chemical Dictionary*, Fifth Edition (1956), Reinhold Pub. Corp., N.Y., N.Y., p. 1169.

*Primary Examiner*—Patrick Garvin
*Attorney, Agent, or Firm*—William D. Mooney; Herbert D. Knudsen; Larry W. Evans

[57] ABSTRACT

The invention herein is directed toward a method for forming a coating on the surface of a catalyst and includes the steps of dissolving a membrane forming compound in a hdyrocarbon solvent, adding the catalyst to the solvent and agitating to form a mixture and finally drying the mixture to form particles of the catalyst having a coating of the membrane forming compound. Particularly suitable for the polymerization of monoolefins are Ziegler-Natta catalyts which can be coated according to the foregoing method. The compounds forming the coating include the silicone greases obtained by mixing a filler material with a dimethylpolysiloxane fluid.

8 Claims, No Drawings

MONOOLEFIN CATALYSTS AND METHOD FOR THE PREPARATION THEREOF

TECHNICAL FIELD

The present invention is directed toward the coating of conventional catalysts for the polymerization of monoolefins such as propylene. Existing catalysts which are employed in the practice of the present invention are Ziegler-Natta catalysts which comprise titanium-containing compounds and phosphorus-containing compounds. While these catalysts are generally employed in the gas phase polymerization of propylene, it has nevertheless been difficult to control the reaction rate and, in turn, the polypropylene yields. One reason for this is the lack of total separation of catalyst particles from each other, minimizing effective surface area. Another reason is that the exothermic polymerization reaction creates hot spots on the catalyst particle around which the polymer melts, again decreasing effective surface area. By forming a suitable coating or membrane around the catalyst particles, it is believed that surface area can be improved and better control over the reaction can be exercised.

BACKGROUND ART

Although the patent literature provides catalyst systems for the polymerization of monoolefins, we are not aware of any teachings directed toward forming or employing coatings to improve catalyst performance. A typical patent describing the preparation of a catalyst and the use thereof is U.S. Pat. No. 3,977,997. The catalyst comprises a titanium-containing compound and a phosphorus-containing compound and is prepared by dry milling both components together in a vibratory ball mill.

A later U.S. patent, No. 4,124,532, discloses a catalyst for polymerization of olefins which comprises a complex formed from metals such as magnesium, manganese, calcium, titanium, vanadium and zirconium, halogens such as chlorine, bromine and iodine, one or more nitrogen, oxygen or sulfur-containing organic compounds and an organic electron-donor compound. Both patents provide exemplification wherein the catalyst and propylene are charged to a reactor to prepare polypropylene, demonstrating the operability of the catalyst, but silent as to improving the reaction rate and yield.

Lastly, U.S. Pat. No. 3,594,330 provides for polymerization of olefins utilizing a supported catalyst wherein the support can be a polyolefin such as polypropylene. By using polypropylene as the support, contamination of the polymer by the catalyst support is avoided. While a useful technique, this patent is nevertheless devoid of suggestion pertaining to providing the catalyst with a coating in order to improve its effectiveness.

DISCLOSURE OF THE INVENTION

It is therefore an object of the present invention to provide a method for forming a coating on the surface of a catalyst for the polymerization of monoolefins.

It is another object of the present invention to provide a catalyst for the polymerization of monoolefins, the particles of which carry a permeable barrier membrane or protective coating.

It is another object of the present invention to provide a catalyst, as set forth hereinabove, having a protective membrane or coating of a high melting material which will insulate active surface areas on the catalyst particle from melting polymer resulting from large exotherms.

It is still another object of the present invention to provide a catalyst, as set forth hereinabove, having a protective membrane or coating thereby providing for control over the quantity of feed material at the catalyst surface, thus influencing the reaction rate.

It is a further object of the present invention to provide a catalyst, as set forth hereinabove, having a protective membrane or coating which permits surface interactions of the catalyst and co-catalyst to be controlled.

These and other objects, together with the advantages thereof over the prior art, which shall become apparent from the specification which follows, are accomplished by our invention as hereinafter described and claimed.

In general, the method for forming a coating on the surface of a catalyst, according to the present invention, includes the steps of dissolving a membrane forming compound in a hydrocarbon solvent, adding the catalyst to the solvent and agitating to form a mixture and finally drying the mixture to form particles of the catalyst having a coating of the membrane forming compound.

Particularly suitable for the polymerization of monoolefins are Ziegler-Natta catalysts which are then coated in the manner set forth herein. If desired, the catalyst can be supported, as is known in the art, and it may also be mixed with a co-catalyst. The compounds utilized to form the coating are selected from the group consisting of silicones, tetraalkyl silicons, silicon alkyl halides, silicon alkyl hydrides and hydrogenated normal and branched paraffins from crude oil. Preferred are the silicone compounds comprising silicone greases obtained by mixing a filler material with a dimethylpolysiloxane fluid.

PREFERRED MODE FOR CARRYING OUT THE INVENTION

Catalysts used for the polymerization of some monoolefins, and utilized in the practice of the present invention are the Ziegler-Natta catalysts. Typical catalysts are titanium-containing compounds such as $TiCl_3$ or $TiCl_3 \cdot \frac{1}{3}AlCl_3$, both of which have been known and used for years and are commercially available and therefore need not be discussed in greater detail. If desired, the catalyst can be modified by the addition of a phosphorus-containing promoter such as tri-n-butylphosphine or an ester of an aromatic acid, e.g., ethyl benzoate. The promoter is added in a molar ratio of catalyst to promoter of from 1:0.1 to 1:1. In the presence of a co-catalyst such as an alkyl-aluminum compound a catalyst complex is formed which is employed for the stereospecific polymerization of propylene. Suitable alkylaluminum compounds having the formula $R_nAlX_{3-n}$, where R is an alkyl or alkoxy group having one to about four carbon atoms, X is chlorine or bromine and n is 1–3, include triethylaluminum, triisobutylaluminum, diethylaluminum chloride, diethylaluminum bromide, ethylethoxyaluminum chloride, diethylethoxyaluminum and the like. Other co-catalyst compounds include alkylaluminums with an ester of an aromatic acid, such as triisobutylaluminum with methyl para-toluate. The amount of titanium-containing catalyst employed in proportion to the amount of polypropylene obtained, is as follows:

$$\frac{\text{gms of polypropylene}}{\text{gms of Ti in catalyst}} = 3000 \text{ to } 100{,}000$$

The amount of co-catalyst employed is selected so that the Al/Ti molar ratio is from one to about 500.

Catalysts of the foregoing type are discussed in U.S. Pat. No. 3,977,997, the subject matter of which is incorporated herein by reference. Other catalysts that are known for the polymerization of propylene and similar olefins are set forth in U.S. Pat. Nos. 4,124,532 and 4,149,990 also incorporated herein by reference. It is to be understood that selection of a particular catalyst for the polymerization can be made by those skilled in the art and that the catalyst composition per se is therefore not deemed to be a part of the subject invention. An object of the present invention being to provide a coated catalyst, the coating material utilized and the method of forming it should be applicable to known, solid catalysts useful for the polymerization of monoolefins.

As is also known, such catalysts can be employed in supported or nonsupported form. Nonsupported, the catalyst comprises small solid particles as generally result from manufacture of the catalyst on a ball mill. In supported form, the catalyst is carried on the surface of small particles of support materials comprising such materials as alumina or corundum, aluminum silicates, magnesium silicate, magnesia, titanium oxide and the like as well as polyolefins. Use of polyolefins is generally preferred inasmuch as the catalyst and support become incorporated within the polypropylene particle. By utilizing polypropylene as the support, contamination of the polymer product is minimal.

To support the catalyst, it is common to mix the catalyst with a hydrocarbon solvent such as hexane or heptane, saturate the support material with the resulting mixture, and then evaporate the solvent. The amount of the catalyst that can be absorbed in relation to the support chosen will be such that the total volume of the support pores will be equal to the volume of catalyst. Preparing supported catalysts is also known in the art, one such process being set forth in U.S. Pat. No. 3,593,330.

The coating or membrane forming compound utilized in the practice of the present invention is a silicon compound selected from the group consisting of silicones, tetraalkyl silicons, silicon alkyl halides and silicon alkyl hydrides. Particularly useful are the silicones viz., dimethylpolysiloxanes, the preferred form being a grease which results from mixing certain fillers with silicone fluids having the following general formula

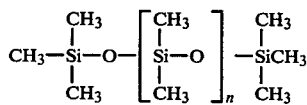

where n is a number from 0 to 9. Filler materials include soap, carbon black, silica and the like. One source of suitable silicone compound is stopcock grease, manufactured and sold by Dow Corning as a proprietary formulation, most likely the foregoing silicone fluid filled with soap.

In addition to silicon compounds, it is believed that various high boiling hydrocarbon-containing materials could be employed. These would normally include hydrogenated normal and branched paraffins from crude oil.

The amount of membrane forming compound utilized to form the coating ranges from about 10 to about 300 percent by weight, based upon the weight of the catalyst.

The preferred method of coating the catalyst is accomplished during preparation of the catalyst particle and the coating thereof on a support. A hydrocarbon solvent is selected to dissolve the membrane forming compound following which is added the catalyst, catalyst promoter and catalyst support with agitation in a suitable vessel. The resulting mixture is thereafter dried for about 12 hours following which the co-catalyst is added. The final mixture is dried for approximately one hour and can then be charged to the polymerization reactor.

In order to demonstrate the efficacy of the foregoing method and, in turn, the usefulness of the coated catalyst, the coated catalyst was prepared, as is set forth in Example 1, which catalyst was thereafter utilized to polymerize a charge of propylene.

EXAMPLE 1

Into a glass jar was charged 0.5 gms of Dow Corning silicone grease followed by 17 cc of normal heptane to dissolve the grease. Next was added 0.36 gms of a TiCl$_3$·⅓AlCl$_3$ catalyst and 0.17 gms of tri-n-butylphosphine solution, followed by 25.00 gms of polypropylene particles as a support. The heptane was thereafter evaporated during a drying period of 12 hours. 1.14 gms of diethylaluminum chloride was added to the resulting mixture; the final mixture then being dried for one hour.

The coated catalyst resulting from Example 1 was charged to a 2.0 liter stainless steel, spiral mixer agitated, gas phase reactor. Propylene gas was charged and maintained in the reactor which was operated at about 71° C. and 24.61 Kg/cm$^2$ gauge. After 3.3 hours of polymerization, the reactor was totally filled with 650 gms of polypropylene polymer. Properties of the polymer appear in Table I, under the heading "Example 1 Catalyst."

For comparison, a control catalyst was prepared exactly as in Example 1 but without the addition of any silicone grease. This catalyst was charged to the 2.0 liter vessel with propylene monomer and after 3.5 hours of polymerization, 500 gms of polypropylene were obtained. Properties of this polymer also appear in Table I, under the heading "Control Catalyst."

TABLE I

|  | Example 1 Catalyst | Control Catalyst |
|---|---|---|
| Weight (gms) | 650 | 500 |
| Melt Index | 0.019 | 0.017 |
| % Heptane Insolubles | 93.8 | 98.4 |
| ppm Ti in polymer | 122 | 152 |
| ppm Al in polymer | 430 | 495 |
| ppm P in polymer | 2.0 | 2.5 |
| Average particle size ($\mu$) | 506 ± 14 | 545 ± 16 |
| Tamped Bulk Density (gms/cc) | 0.40 plus improved bulk density | 0.33 |

The coated catalyst, as prepared in Example 1, provided a 30 percent increase in reaction rate and polymer yield over the existing procedure for preparing the catalyst as was utilized for the control. Bulk density of the polypropylene resulting from the catalyst of Example 1 was also improved.

Based upon the improved results that have been obtained when a typical Ziegler-Natta catalyst, coated according to the method set forth herein, has been employed, it should be apparent that the objects of the invention have been met. It is to be understood that the coating per se and related method is applicable in general to soild Ziegler-Natta catalysts used for the polymerization of monoolefins in general as well as propylene specifically. As stated hereinabove, such catalysts can include known co-catalysts and promotors and can be supported Presence or absence of these additional compounds will not affect practice of the present invention. And, while these may be employed to improve some aspect of the performance of the catalyst, the specific catalyst composition is not deemed to be a portion of the invention claimed herein.

It should also be apparent to those skilled in the art that other membrane forming compounds can be utilized to form coatings on the catalyst particles. It is therefore to be understood that variations of the disclosure fall within the scope of the claimed invention and that the subject invention is not to be limited by the example set forth herein. It has been provided merely to provide a demonstration of operability and therefore the selection of coating materials and methods for coating catalyst particles therewith can be determined without departing from the spirit of the invention herein disclosed and described. Moveover, the scope of the invention shall include all modifications and variations that fall within the scope of the attached claims.

I claim:

1. A method for forming a coating on the surface of Ziegler-Natta catalysts for the polymerization of monoolefins comprising the steps of:
    dissolving a membrane forming compound, selected from the group consisting of silicones, tetraalkyl silicons, silicon alkyl halides and silicon alkyl hydrides, in a hydrocarbon solvent;
    adding the Ziegler-Natta catalyst to said hydrocarbon solvent and agitating to form a mixture; and,
    drying said mixture to form particles of the catalyst having a coating of said membrane forming compound.

2. A method as set forth in claim 1, wherein said silicone compound is a silicone grease comprising a dimethylpolysiloxane fluid, having the formula

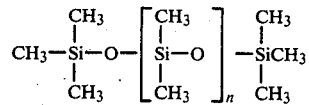

where n is a numeral from 0 to 9; and,
a filler material.

3. A method as set forth in claim 2, wherein said hydrocarbon solvent is selected from the group consisting of hexane and heptane.

4. A method as set forth in claims 1 or 2 comprising the additional step of:
    adding a catalyst support material with the catalyst to said hydrocarbon solvent.

5. A method as set forth in claim 4, comprising the additional step of:
    mixing a co-catalyst with said coated catalyst, said co-catalyst having the formula $R_nAlX_{3-n}$;
    wherein R is an alkyl having one to about four carbon atoms, X is chlorine or bromine and n is 1 to 3.

6. A method as set forth in claim 5, wherein said support material is a polyolefin particle and said co-catalyst is diethylaluminum chloride.

7. A Ziegler-Natta catalyst for the polymerization of monoolefins the improvement wherein the catalyst particles are provided with a coating comprising a membrane forming compound selected from the group consisting of silicones, tetraalkyl silicons, silicon alkyl halides and silicon alkyl hydrides.

8. A Ziegler-Natta catalyst, as set forth in claim 7, wherein said silicone compound is a silicone grease comprising:
    a dimethylpolysiloxane fluid, having the formula

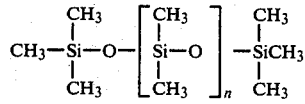

where n is a numeral from 0 to 9; and,
a filler material.

* * * * *